Figure 1:
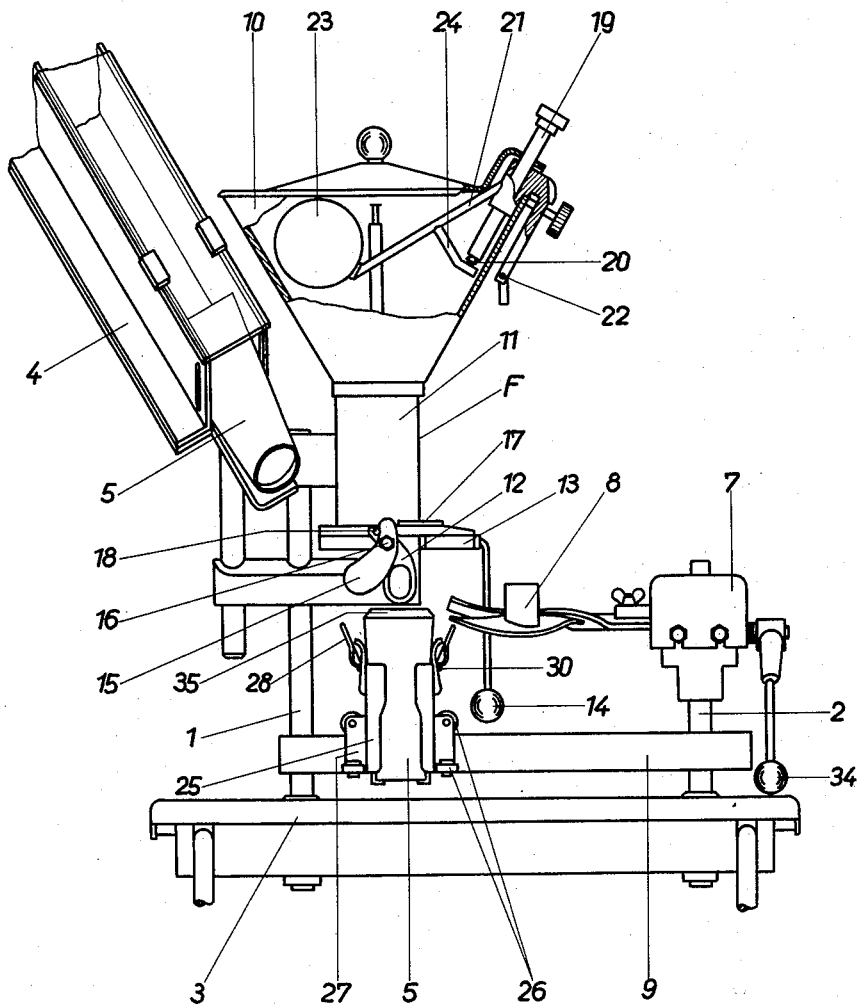

June 2, 1959 G. MEYER-JAGENBERG 2,888,794
APPARATUS FOR FILLING, FOLDING AND CLOSING
CONTAINERS OF PAPER, CARDBOARD OR THE
LIKE CARTON-FORMING MATERIAL
Filed Aug. 3, 1956 5 Sheets-Sheet 1

Inventor
G. Meyer-Jagenberg

June 2, 1959  G. MEYER-JAGENBERG  2,888,794
APPARATUS FOR FILLING, FOLDING AND CLOSING
CONTAINERS OF PAPER, CARDBOARD OR THE
LIKE CARTON-FORMING MATERIAL
Filed Aug. 3, 1956  5 Sheets-Sheet 4
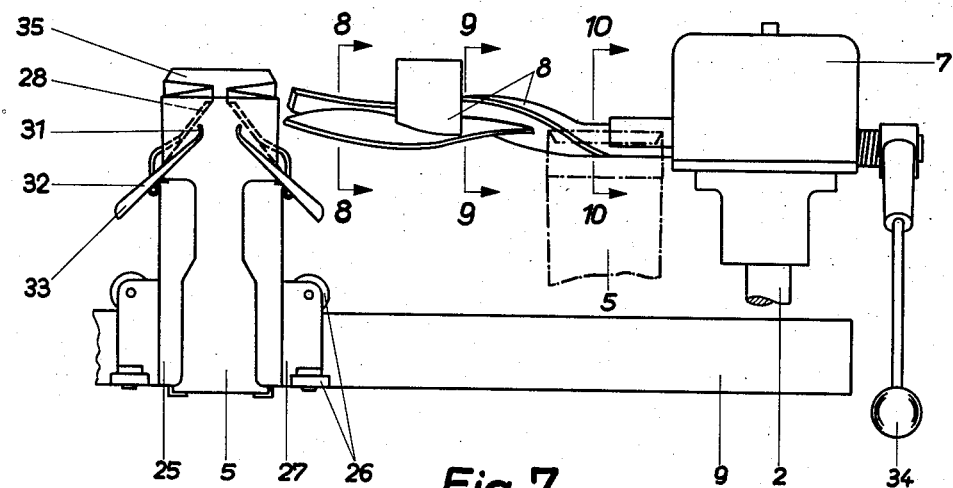
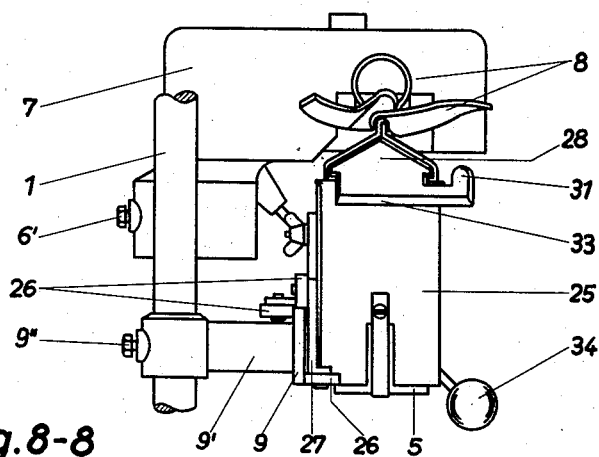
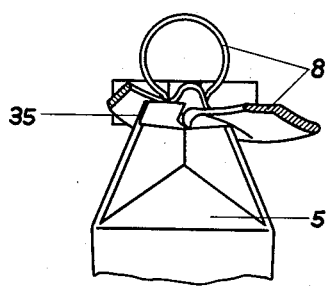
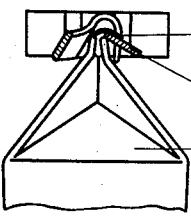
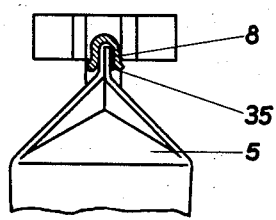
Inventor
G. Meyer-Jagenberg June 2, 1959  G. MEYER-JAGENBERG  2,888,794
APPARATUS FOR FILLING, FOLDING AND CLOSING
CONTAINERS OF PAPER, CARDBOARD OR THE
LIKE CARTON-FORMING MATERIAL
Filed Aug. 3, 1956  5 Sheets-Sheet 5

Inventor
G. Meyer-Jagenberg
By Glascock Downing Seebold
Attys.

United States Patent Office 2,888,794
Patented June 2, 1959

2,888,794

APPARATUS FOR FILLING, FOLDING AND CLOSING CONTAINERS OF PAPER, CARDBOARD OR THE LIKE CARTON-FORMING MATERIAL

Gunther Meyer-Jagenberg, Dusseldorf-Grafenberg, Germany, assignor to Jagenberg-Werke Akt.-Ges., Dusseldorf, Germany Application August 3, 1956, Serial No. 602,007

Claims priority, application Germany August 5, 1955

6 Claims. (Cl. 53—266)

The present invention broadly relates to the art of filling and closing containers.

More particularly, the invention relates to a method of and means for filling and closing containers of paper, cardboard or the like carton-forming material and which containers are of the type generally intended to hold liquids such as milk.

The invention from a more specific standpoint relates to a method of and means for closing a filled container of carton-forming material by transforming a portion of the wall area of a multi-sided carton that is above the filling level into a folded closure including the application of heat and pressure to a closure flap to obtain an adequately closed container.

When filling and closing paper or other carton-forming material containers, particularly those in which portions of the walls above the filling level are folded, this closing is effected in such a manner that the upper border of the container edge remains in one plane and the upper edge of the container body is compressed by the application of heat and pressure to form a fluid tight closure. It is customary when utilizing hand operated filling and closing mechanisms to effect the folding of the closure by hand after the container has been filled and then to bring the prepared container into the region of the means that applies heat and pressure and closes the same. With this method of operation, however, the conditions prerequisite for obtaining satisfactory pre-folding of the closure forming parts and for effecting a fluid-tight closure are not realized.

The present invention, therefore, has for an object to effect the filling and closing of containers of the type in question by performing the pre-folding, closing and sealing of the closure in such manner that the initially pre-folded wall portions are maintained in their pre-folded condition during the subsequent folding and sealing operations. In other words, the container walls are initially pre-folded by manipulating folder arms or blades constructed and arranged to remain in the position assumed during pre-folding and then the container is manipulated through the final folding and sealing steps. This arrangement results in the filled container, conditioned for sealing, being supported by the pre-folding blades so that subsequent action of stationary blades that complete the folding does not exert any undue influence on the containers which might tend to cause movement thereof or disarrangement of the body portion thereof particularly in the uppermost region of the closure. By supporting the walls of the container in the pre-folded condition, it is possible to obtain a rectilinear arrangement of the upper edge of the closure extending parallel to the bottom of the container.

Therefore, the invention has for an object to effect closing of multi-sided containers of paper, cardboard or the like carton-forming material of the type in which the closure is formed by folding portions of opposite walls above the filling level which includes pre-folding opposite wall portions toward one another to initiate similar movement of the other opposite walls and while maintaining the first mentioned opposite walls in pre-folded position, completing the folding movement of the second opposite walls toward one another until they engage along a closing line, then folding a closure flap forming portion that is provided on one of said second mentioned walls over the other of said walls in overlapping relation and then applying heat and pressure to the now overlapped portions of the second mentioned walls to effect a fluid-tight closure.

In connection with this object, it is clear that the container is provided with fold lines and the closure flap forming portion is provided with a suitable heat activatable adhesive so that a proper closure seal is effected.

In carrying out the method of the present invention, hand operated filling, folding and closing mechanisms are utilized so as to effect reliable and unimpeded filling and closing operations and with the mechanisms being of economical construction thus eliminating the expenditure involved in constructing a completely automatic filling and closing machine. The general organization of parts of the apparatus of this invention comprise a filling mechanism, a cell for receiving containers to be filled, folding and closing elements and a heat and pressure applying device for sealing the closure.

One important feature of the invention consists in providing a cell for receiving containers to be filled and mounting the cell for movement between the filling station and subsequent stations where the final folding and sealing is effected and in providing folder arms or blades in association with the cell for effecting pre-folding so that the container is pre-folded to initiate closure formation and in movement between the filling device and the sealing mechanism the folded closure formation is completed. One advantage of this arrangement consists in the fact that the pre-folding, closing and sealing are effected by compression utilizing simple, but positively actuated, mechanical means so that any conditions which might give rise to any unsatisfactory operations, such as when the individual steps are affected by hand, are eliminated.

Figure 2:
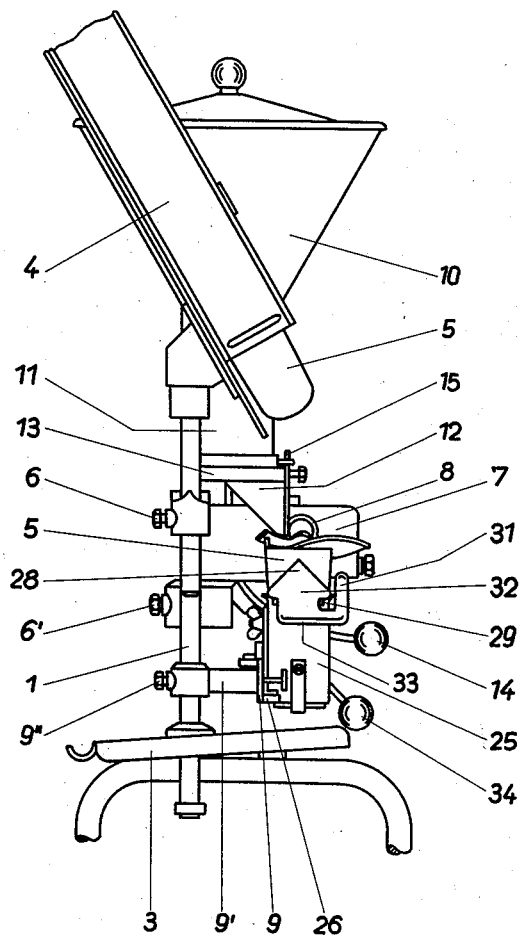
Figure 3:
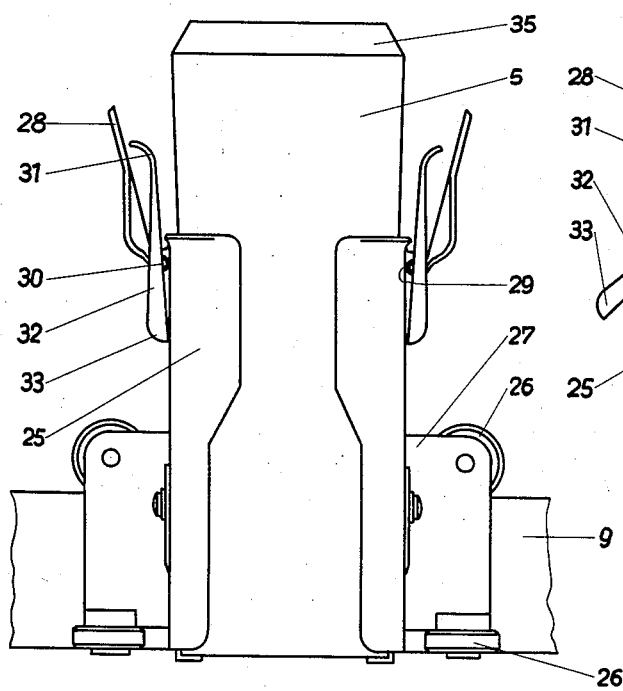
Figure 4:
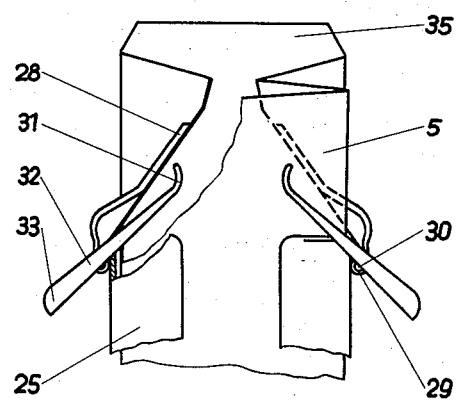
Figure 5:
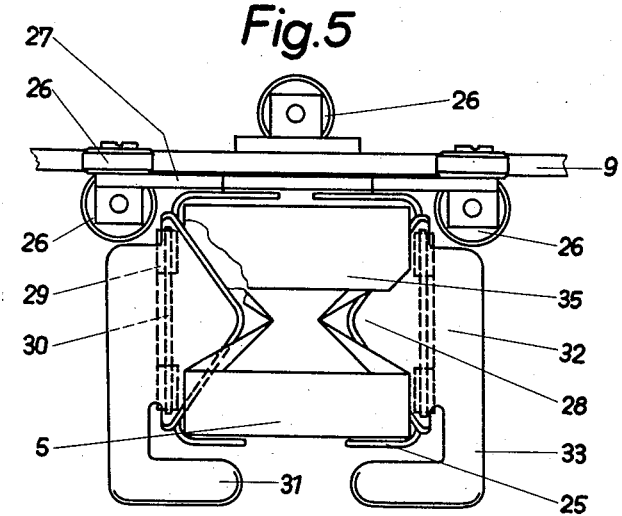
Figure 11:
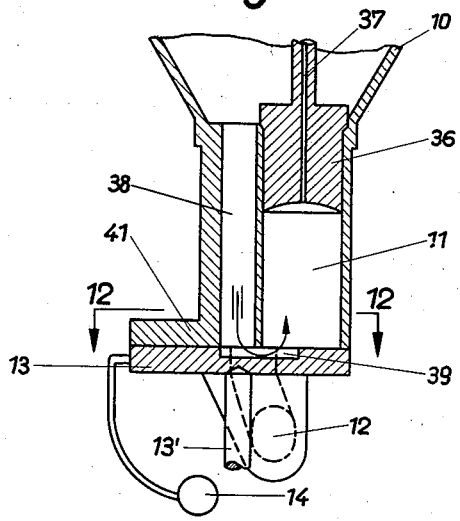
Figure 13:
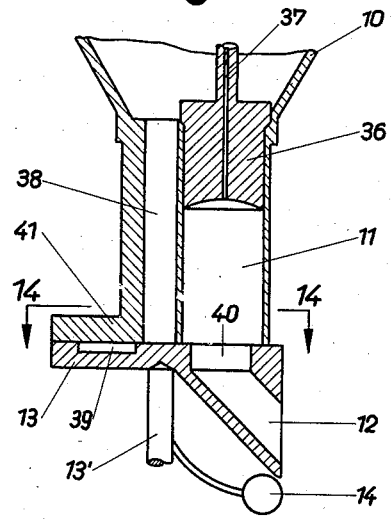
Figure 12:
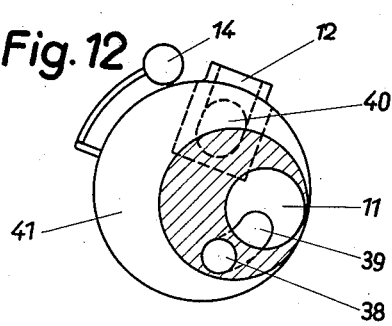
Figure 14:
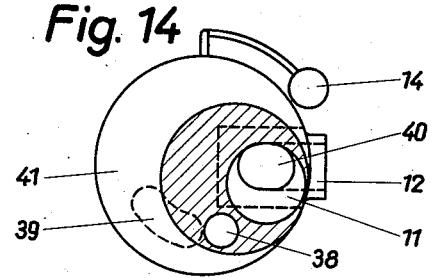
Figure 15:
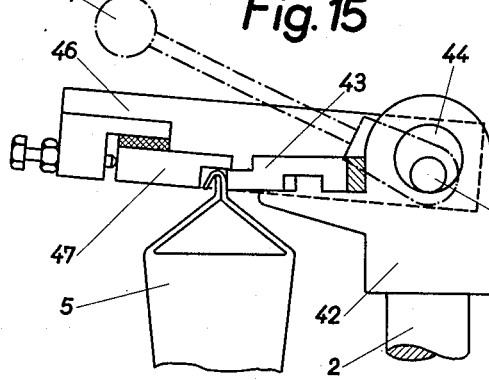
Figure 16:
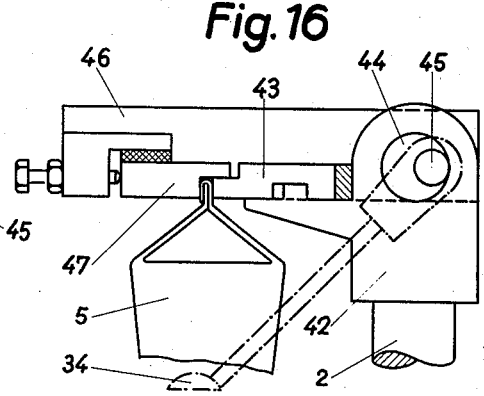

Further and more specific objects will be apparent from the accompanying drawings in which:

Figure 1 is a front view of the apparatus for effecting filling and closing of containers, Figure 2 is a side view of the arrangement of Figure 1, Figure 3 is a fragmentary view illustrating the container receiving cell with the folder blades or arms in an inoperative position, Figure 4 is a fragmentary view partly broken away illustrating the upper portion of the cell with the folder blades or arms in the position they assume during pre-folding, Figure 5 is a fragmentary top plan view of the cell with the folder blades or arms in their end position during prefolding, Figure 6 is a fragmentary view from the front illustrating the mechanism for completing the folding and effecting the final sealing operation, Figure 7 is a side view of the arrangement of Figure 6, and Figures 8, 9 and 10 are fragmentary cross sectional views taken respectively along lines 8—8, 9—9 and 10—10 of Figure 6, Figures 11 to 14 illustrate the filling mechanism in the various working positions, Figures 15 and 16 illustrate the construction and working method of the pressing mechanism.

It is to be pointed out that the present invention is applicable in the pre-folding, final folding and sealing steps to a container which is either multi-sided in cross section, such as square or rectangular, or one in which the upper portion is multi-sided and the body tapers downwardly and merges into a round bottom.

As will be clear from the arrangement of Figures 1 and 2, the apparatus includes a base plate 3 which is supported by a suitable framework or supporting leg structure. Projecting upwardly from the base plate are laterally spaced pillars 1 and 2. The filling mechanism denoted generally at F and the supply magazine 4 are mounted on a cross frame structure which in turn is adjustably secured for vertical movement on pillar 1 by set screw means 6. The pillar 2 supports the heat and pressure applying means 7 which is likewise mounted for adjustable movement by set screw means 6'.

Pillars 1 and 2 also support a guide rail structure 9. The guide rail is carried by a frame 9' and at each end is secured to the respective pillar by a set screw means 9''. The guide rail supports the cell that receives the containers 5 to be filled and closed.

The filling magazine comprises a supply container 10 that receives the liquid and subjacent the same is a measuring cylinder 11. Known mechanism not shown, regulates the flow between the supply container and the measuring cylinder. The lower end of measuring cylinder 11 is closed by a pivotally mounted plate 13. This plate supports a filling nozzle 12 and is moved backwards and forwards as regards the plane of the drawing by hand lever 14. By the backward and forward movement of plate 14, the interior of measuring cylinder 11 is selectively placed in communication with the feed from the supply container 10 and with the opening of the filling nozzle 12 in such manner that in the position shown in Figure 1, filling nozzle 12 is in communication with measuring cylinder 11 so that the contents of the cylinder can flow into the container 5 to be filled, while in this position the feed from the supply container 10 to the measuring cylinder is cut off.

By operation of hand lever 14 and the associated pivotal motion of plate 13, the measuring cylinder is placed in communication with supply container 10 so that the cylinder 11 is filled while at the same time communication is closed between the measuring cylinder and the filling nozzle 12. In this displaced position of plate 13, the measuring cylinder is again filled so that subsequent reversed movement of hand lever 14 will effect the filling of another container. Further details of filling mechanism are given in a separate section.

In order to avoid dripping and leakage of any liquid located in the filling nozzle, the latter is provided with a closure plate 15 that is pivotally mounted intermediate its length on a pin 16. The movement of the plate 15 is controlled in dependence upon the position of the filling nozzle so that the outlet opening of nozzle 12 is exposed only when the filling nozzle is positioned above a container to be filled. To effect this regulation of the closure plate 15, a stationary pressure bar 17 is mounted alongside the cylinder 11 that extends in the path of movement of the upper portion of plate 15 so that in the pivotal motion of plate 13 to place the nozzle 12 out of communication with the measuring cylinder, the upper end of plate 15 is cammed beneath bar 17 so that the lower portion of plate 15 closes the filling nozzle opening. In the reverse movement of plate 13 and thus of the nozzle back to the position shown in Figure 1, the left hand side edge of the closure plate in that portion above pivot pin 16 engages a stationary abutment pin 18 so that the closure plate is swung to open position automatically. In other words, this structural arrangement provides a pivotally mounted closure plate for the outlet opening of the filling nozzle that is automatically closed when the nozzle is displaced from filling position so that the measuring cylinder can be refilled and its automatically opened when the nozzle is moved to filling position so that the contents of the measuring cylinder can flow into a container.

The supply container 10 of the filling magazine is in communication with a feed pipe 19 by way of an inlet valve 20 controlled in a known manner by a float lever 21. This float lever mechanism is so constructed that the pivotally mounted end that surrounds the feed pipe is mounted in a pivot 22 secured to the outer wall of the supply container. The free end of lever 21 supports a float 23, while a projecting arm 24 acts on the inlet valve 20 to such an extent that the proper liquid level is maintained in the supply container 10.

To support the containers for filling and subsequent pre-folding, folding and sealing operations, there is provided a movably mounted cell 25 which, as shown in Figures 3 and 5, consists of a container accommodating frame structure secured to a carrier plate 27 that in turn supports a plurality of guide rollers 26, there being guide rollers that roll on the top of guide rail 9, another pair of guide rollers that roll on the front face of the guide rail at the lower portion thereof and at least one additional guide roller that rolls along the rear face of the guide rail at the upper portion thereof. The arrangement of the supporting rolls facilitates easy lateral displacement of the cell 25. As is also shown in Figures 3 to 5, substantially triangular shaped folder arms or blades 28 are turnably mounted on the upper edge of the side walls of cell 25 by means of hinges 29. Each folder blade has an extension 32 that extends forwardly of the blades and has right angle ends forming small hand levers 31. The hand levers 31 can be manually depressed so that the folder blades can move from the position shown in Figure 3 to that shown in Figures 4 and 5 to effect pre-folding of the closure. The folder blades 28 further include extensions 32 that project beyond the pivot pins 30 and which are constituted as or have attached thereto counter-weights denoted at 33. The counter-weights function, after each filling and closing operation, to automatically return the folder blades 28 into the position shown in Figure 3 upon the removal of a filled and closed container.

It is further to be pointed out that the containers, whether they be square or rectangular throughout their length or, as shown, are multi-sided, that is, substantially square at the upper portion, have the portions of the cotnainer walls that project above the filled level suitably scored or otherwise conditioned for folding with one of the opposite wall-forming portions projecting above the others and constituting a closure flap 35. This flap has a suitable heat and pressure activatable adhesive thereon.

Laterally displaced from the filling mechanism and carried by pillar 2 is the sealing mechanism 7 consisting essentially of a stationary pressing jaw and a movable pressing jaw operated by hand lever 34 and preferably electrically heated. Supported by the jaw structure frame is a folding and laying down blade arrangement 8 positioned to extend toward the filling position. The blade structure 8 first completes the folding of the container closure that was pre-folded by folder blades 28 by constraining the wall-forming portions that are adjacent the pre-folded portions to move toward one another for engagement so that the flap 35 can be folded down in overlapping relation and then the now folded container closure is guided into the pressing mechanism by the portion of the blade mechanism 8 that is adjacent the pressing mechanism 7. Thus during pre-folding, finish folding, and the directly following pressing and sealing of the closure, the procedure is such that the folder blades or arms 28 move, immediately after filling, into the pre-folded position of Figure 4, remain in that position during completion of the folding as well as during the pressing and sealing of the folded closure and thus, as a result of the cooperation between the various folder blades, the conditions necessary for a satisfactory folded closure in correspondence to the disposition of fold lines previously formed on the carton blank are realized.

Construction and working method of filling mechanism F is as follows: Below supply container 10 is the measuring cylinder 11, the contents of which being variable by interchangeable displacement piece 36—see Figs. 11–14. Displacement piece 36 contains an air outlet 37. When in the position shown in Figs. 11 and 12 the liquid flows from supply container 10 into measuring cylinder 11 through tube 38. This tube 38 is connected with the inner chamber of the measuring cylinder 11 by way of channel 39 located in the pivotally mounted plate 13 when inlet opening 40 is covered by end plate 41 of measuring cylinder 11.

When plate 13 is turned by hand-lever 14—see Figs. 13 and 14—channel 39 moves out of the area of tube 38 and measuring cylinder 11 and is covered by end plate 41. At the same time inlet opening 40 of filling nozzle 12 moves into the area of measuring cylinder 11 and the liquid flows into container 5. The plate 13 is supported on a fixed pin 13'.

Construction and working method of pressing mechanism is as follows: Bracket 42 with its stationary pressing jaw 43 is mounted on pillar 2. Bracket 42 contains stud 44 which is mounted for pivoting movement and has an eccentric end 45 at either side. On these eccentric ends 45 the oscillating holder 46 carrying the movable pressing jaw 47 is mounted. By actuating hand-lever 34 which is also mounted on one of the eccentric ends 45 the movable pressing jaw 47 is moved down and simultaneously also in the direction of stationary pressing jaw 43. Thereby the necessary pressure onto the container closure is obtained.

The operation of filling and closing a container in accordance with the present invention is as follows:

The operator first removes the end container 5 from the supply magazine 4 and places it in the cell 25 so that the closure flap 35 extends parallel to the guide rail 9. By manipulating hand lever 14, the filling nozzle is brought into position above the now supported container, the closure plate 15 opens automatically, and the contents of measuring cylinder 11 flow into the container supported by the cell. After the container has been filled, hand lever 14 is reversely manipulated to remove the filling nozzle and plate 13 to the position where the measuring cylinder is again filled while during this movement the closure plate 15 is closed. Following this, the operator depresses hand levers 31 whereby folder arms 28 move toward one another and displace the opposite wall portions of the container that extend perpendicular to the guide rail toward one another and in so doing start to move the other opposite wall portions toward one another. Simultaneous with the movement of the hand levers, the operator moves the cell 25 toward the pressing mechanism so that the pre-folded container wall portions pass through successive stages of final folding in which the four walls of the container at the upper edges are brought into engagement and the closure flap is folded down in overlapping relation over the upper portion of the wall opposite the closure flap. Continued movement of the cell 25 toward the pressing mechanism 7 guides the now folded closure between the jaws of the pressing mechanism whereby manipulation of handle 34 applies heat and pressure to the folded closure to complete the sealing of the closure. After the pressing jaw mechanism has been manipulated to release the closure, the cell 25 and the now filled and closed container therein are moved back to starting position, Figure 1, and the container can be withdrawn from the cell 25 whereby on the removal of the container, folder arms or blades 28 again assume the position shown in Figure 3 so that another container can be inserted in the cell to commence a new filling and closing cycle.

It is, therefore, clear that the invention provides a simple and effective method of filling, closing and sealing containers, at least the upper portions of which have opposed wall forming and closure forming portions projecting above the filling level and provided with fold lines to determine a folded closure, including supporting such a container with its open end up at a filling station, filling the container, pre-folding a first pair of opposed wall forming portions by moving the same toward one another, this movement initiating movement of the other pair of wall forming portions together toward one another, laterally displacing the now filled and pre-folded container toward a sealing mechanism while maintaining the walls in initially pre-folded condition and during displacement effecting engagement of the walls with respect to one another and folding a closure flap forming portion provided on one wall into overlapping engagement with the opposite wall and guiding the now folded closure into the sealing mechanism. Following sealing, the now filled, closed and sealed container is displaced back toward the filling position and removed from that position so that a new filling and closing operation can be effected on another container.

The invention further includes apparatus for effecting filling and closing which includes a stationarily mounted filling mechanism, a sealing mechanism for applying heat and pressure to a folded closure mounted in laterally spaced relation to the filling mechanism, a displaceable cell structure for accommodating a container to be filled, manually operated means for controllably filling successive containers, means mounting the cell for displacement between the filling mechanism and sealing mechanism, manually operated pre-folding blades associated with the cell for initiating pre-folding of the container closure and stationarily mounted final folding and closing blade structures extending between the sealing mechanism and the filling mechanism and operative to effect final folding and closing of the container and guiding thereof into the sealing mechanism during lateral displacement of the cell and the container therein between the filling mechanism and the sealing mechanism and said pre-folding blades being adapted to be maintained in the position occupied during pre-folding while the cell is displaced between the filling mechanism and the sealing mechanism.

What is claimed is:

1. In apparatus for filling and closing containers of paper, cardboard or the like carton-forming material and which containers are of the type which include an upper wall structure extending above a filling level that is multi-sided, lined to determine a folded closure and in which one wall has a closure flap forming extension thereon adapted to be sealed by the application of heat and pressure, the improvements comprising a filling station wherein successive containers are adapted to be filled, a sealing station displaced from said filling station and including means adapted to seal a folded container, a folding blade structure extending from the sealing station toward the filling station and adapted to complete the folding of the closure, said folding blade structure including spaced fold-forming blades, a cell structure adapted to support a container with its open end up, means mounting the cell structure for movement between the filling station and the sealing station and pre-folding blades movably mounted on the cell structure and adapted upon actuation to initiate movement of opposite walls toward one another to impart similar movement to the other walls whereby displacement of the cell structure between the filling station and the sealing station with the pre-folding blades maintained in pre-folding position moves the container wall structure toward and between the spaced folder blades to complete the formation of the folded closure and to guide the now completed folded closure into the sealing station so that it can be sealed.

2. In apparatus for manipulating containers of paper, cardboard or the like carton-forming material to close and seal the same and which containers are of the type wherein at least the upper portion thereof is multi-sided and has fold lines thereon to determine a folded closure lying above a filling level, comprising a base, spaced pillars projecting upwardly from the base, a sealing head structure supported on one of said pillars and including laterally accessible sealing components adapted to receive a folded closure therein and effect sealing of the same, a guide rail extending between the pillars at a level beneath the sealing head structure, a cell means adapted to receive a container with its open end directed upwardly, means supporting the cell means for movement along the guide rail, a pair of pre-folding blades pivotally connected to the cell means on opposite sides thereof that extend perpendicular to the guide rail for movement about axes perpendicular to the guide rail and adapted to effect pre-folding of opposite container wall portions toward one another and additional folding blade means carried by the sealing head structure and extending toward the other pillar at a level to cooperate with the upper portion of the container to complete the folding of the folded closure and to guide the folded closure into the sealing head structure in response to displacement of the cell means to a position underlying the sealing head structure.

3. Apparatus as claimed in claim 2 and a filling mechanism carried by said other pillar and including means adapted to fill successive containers supported in the cell means when the latter is disposed beneath the filling mechanism.

4. Apparatus as claimed in claim 3 in which the filling mechanism and the sealing head structure are adjustably mounted for vertical movement along the respective pillars so as to accommodate different height containers.

5. Apparatus for manipulating cartons of the type in which at least the upper wall structure is multi-sided, has fold lines thereon to determine a folded closure above a filling level, comprising a displaceable cell structure adapted to receive a single container with its open end directed upwardly, a pair of prefolding blades carried by the cell structure and movably mounted between an inoperative position permitting insertion of a container and another position wherein opposite walls of the containers are prefolded by being moved toward one another, said blades being triangular in plan, means movably mounting the cell structure, a sealing head structure supported in the line of movement of the cell structure and adapted to seal the folded closure, and means supported in the line of movement of the cell structure for completing the folding of the closure and guiding the folded closure into the sealing head structure upon displacement of the cell structure toward and into a position underlying the sealing head structure.

6. Apparatus for manipulating cartons of the type in which at least the upper wall structure is multi-sided, has fold lines thereon to determine a folded closure above a filling level comprising a displaceable cell structure adapted to receive a single container with its open end directed upwardly, a pair of pre-folding blades carried by the cell structure and movably mounted between an inoperative position permitting insertion of a container and another position wherein opposite walls of the containers are pre-folded by being moved toward one another, said blades being triangular in plan, and a stationary folding blade arrangement extending in the line of movement of the cell structure, supported by the sealing head structure and adapted to complete the folding of the closure and guide the folded closure into the sealing head structure upon displacement of the cell structure toward and into a position underlying the sealing head structure.

References Cited in the file of this patent

UNITED STATES PATENTS

| | | |
|---|---|---|
| 1,563,715 | Bowlanger | Dec. 1, 1925 |
| 2,093,136 | Orstrom | Sept. 14, 1937 |
| 2,669,815 | Zinn et al. | Feb. 23, 1954 |
| 2,750,721 | Earp et al. | June 19, 1956 |